(No Model.)

J. J. SHANNON.
FORK FOR HANDLING COTTON AND OTHER SUBSTANCES.

No. 303,672. Patented Aug. 19, 1884.

Witnesses:
J. P. Theo. Lang.
Robt. L. Fenwick.

Inventor:
Joel J. Shannon
by his atty
Fenwick & Lawrence

N. PETERS. Photo-Lithographer, Washington, D. C.

UNITED STATES PATENT OFFICE.

JOEL J. SHANNON, OF PARIS, TEXAS.

FORK FOR HANDLING COTTON AND OTHER SUBSTANCES.

SPECIFICATION forming part of Letters Patent No. 303,672, dated August 19, 1884.

Application filed April 1, 1884. (No model.)

*To all whom it may concern:*

Be it known that I, JOEL J. SHANNON, a citizen of the United States, residing at Paris, in the county of Lamar and State of Texas, have invented a new and Improved Fork for Handling Cotton and other Substances, of which the following, in connection with the annexed drawings, is a specification.

My invention relates to a hand-fork for handling cotton in the seed and cotton-seed at the gins, as well as for other useful purposes; and it consists in the novel construction of the teeth or tines and head, together with the means for fastening the teeth to the head, as will be hereinafter described and specifically claimed.

Figure 1:
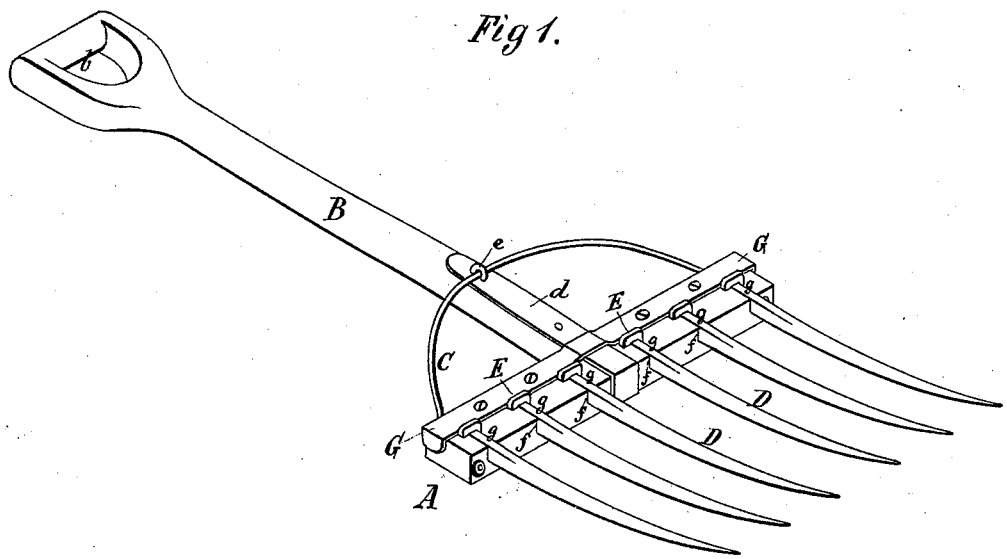
Figure 2:
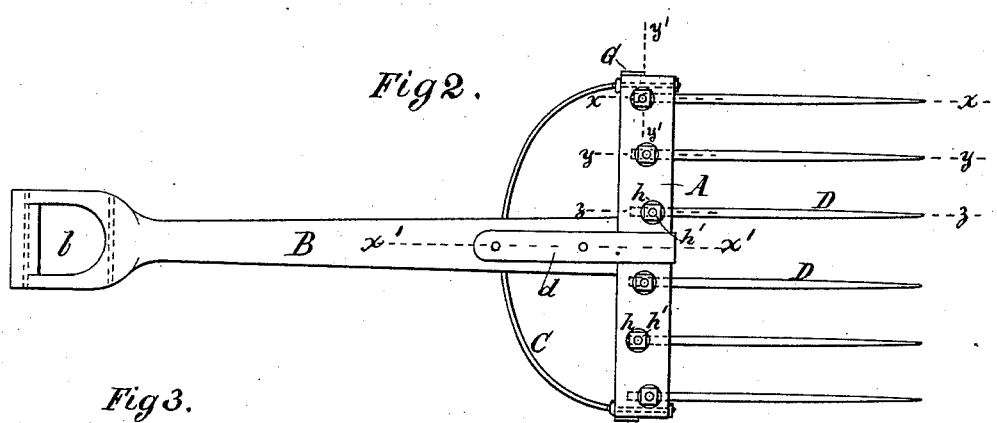
Figure 3:
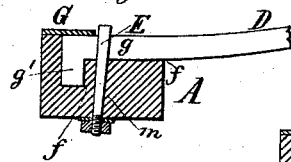
Figure 5:
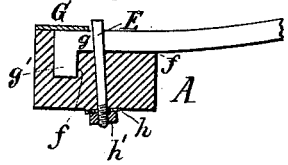
Figure 4:
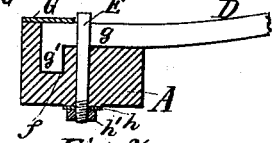
Figures 6, 7:
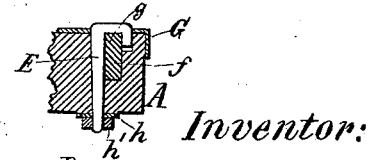

In the accompanying drawings, Figure 1 is a perspective view of the upper side of my improved fork, and Fig. 2 an inverted plan view of the same. Figs. 3, 4, and 5 are broken detail vertical sections of the head, a tooth or tine, and fastening device, taken, respectively, in the lines $x\,x\;y\,y\;z\,z$ of Fig. 2. Fig. 6 is a broken vertical section in the line $x'\,x'$ of Fig. 2, and Fig. 7 is also a broken vertical section in the line $y'\,y'$ of Fig. 2.

The head A of the fork, as represented in the drawings, is made of strong durable wood, and to its rear side is attached a handle, B, having a loop, $b$, at its upper end similar to that on an ordinary fork, and a tenon, $c$, at its lower end, which enters a mortise in the head. The handle and head are firmly united by a metal strap, $d$, which is looped upon the head and extended forward upon both the upper and under sides of the handle and securely fastened by rivets or screws. A bow-brace or stay, C, is connected to each end of the head at the rear and confined by a staple, $e$, driven into the handle, as shown. In the top of the fork-head A L-shaped depressions $f$ are made, the same running transversely of the head from the front to near the rear sides of the head, as shown. These depressions are spaced in a manner corresponding to the distances or spaces between the teeth or tines D, and they serve to receive the L-shaped shanks $g$ of the tines, and when said shanks are set into them their upper surfaces come flush with the top of the fork-head. The teeth or tines are curved or bent upward from a horizontal plane at the points where they extend out from their shanks $g$, as shown, and each shank is bent downward at a right angle to the portion $g$, so as to form the hooking portion $g'$, and thus the shank takes the form of the letter L and corresponds to and fits the L-shaped depressions $f$ of the fork-head, as shown. The shanks of the tines or teeth D are set down into the depressions $f$, and each is confined by means of a hook-headed clamp-bolt, E, provided with a washer, $h$, and nut $h'$ on its screw-threaded end. The hook-head of the bolt E stands across the shank of the tine, and the bolt passes down through a hole in the head on one side of the tine, while the short vertical portion forming the hook enters a shallow hole in the head on the other side of the tine, and by drawing up the bolt with a nut, $h'$, the tine is securely clamped in position.

In applying the clamp-bolts most of them are placed in holes $m$, bored on an inclination from a straight line, and also out of line with one another. The inclination thus given to the clamp-bolts tends to give them a forward drawing action upon the tines, and thus causes the hooking ends of the tines to take a firmer hold against the forward shoulder of the recessed head, and the insertion of the bolt on a diagonal or curved line, as shown in Fig. 2, lessens the liability of the wooden head A splitting when the fork is heavily loaded or in use doing heavy work.

In order to re-enforce or strengthen the wooden head, and also aid the clamp-bolts in holding the several tines firmly in place, a strong metal strap, G, is applied upon the rear upper surface of the head A, so as to extend from end to end of the head and bear down upon the hooked ends of the tines in rear of the hook-heads of the clamp-bolt E. This strap G is fastened by screws, and it serves to stay the head and the strap which unites the handle and head. With my construction of fork the respective teeth can be detached whenever any of them become broken and it is necessary to replace the same with new teeth. This is effected by unscrewing the strap G and loosening the hook-headed screw-clamp bolt or bolts, which confine the shank or shanks of the broken tooth or teeth, and then taking out the shank or shanks of the broken tooth or teeth and inserting a new tooth or teeth, and again screwing down the strap G and tightening up the clamp bolt or bolts. If it is desired, the head A can be made of metal, recessed as at $f$, and the strap G screwed upon it; but the wooden head is lighter, and would possibly be cheaper and more durable in some sections of the country.

In manufacturing I have found that a fork with a head of about sixteen inches and teeth about eighteen inches in length will serve a good purpose, the same holding a proper bulk of cotton in seed, or of cotton-seed at the gins, for one person to lift, and with such a fork about the same quantity of cotton can be handled in a given time by one man as can be handled with ordinary means by six men.

What I claim as my invention, and desire to secure by Letters Patent, is—

1. The fork comprising, in combination, the head A with L-shaped recesses $f$, the tines D with L-shaped shanks $g\ g'$, the hook-headed clamp-bolts E, and the confining-strap G, substantially as and for the purpose described.

2. The fork comprising, in combination, the head A, having bolt-holes inclined and out of line, the tines D, having shanks $g\ g'$, the hook-headed clamp-bolts E, and the strap G, substantially as and for the purpose described.

3. The fork comprising, in combination, the head A, having L-shaped recesses, the handle B, strap $d$, brace C, the tines D, having L-shaped shanks $g\ g'$, the hook-headed clamp-bolts E, and the confining-strap G, substantially as and for the purpose described.

JOEL J. SHANNON.

Witnesses:
JAS. D. WORTHAM,
JULIUS P. RECORD.